Oct. 31, 1961 W. B. COWAN 3,006,583
LOCKING AND ACTUATING MECHANISMS FOR AIRCRAFT CANOPIES
Filed Nov. 19, 1957 3 Sheets-Sheet 1

Inventor:
William Bathie Cowan
By: Stevens, Davis, Miller & Mosher
Attorney

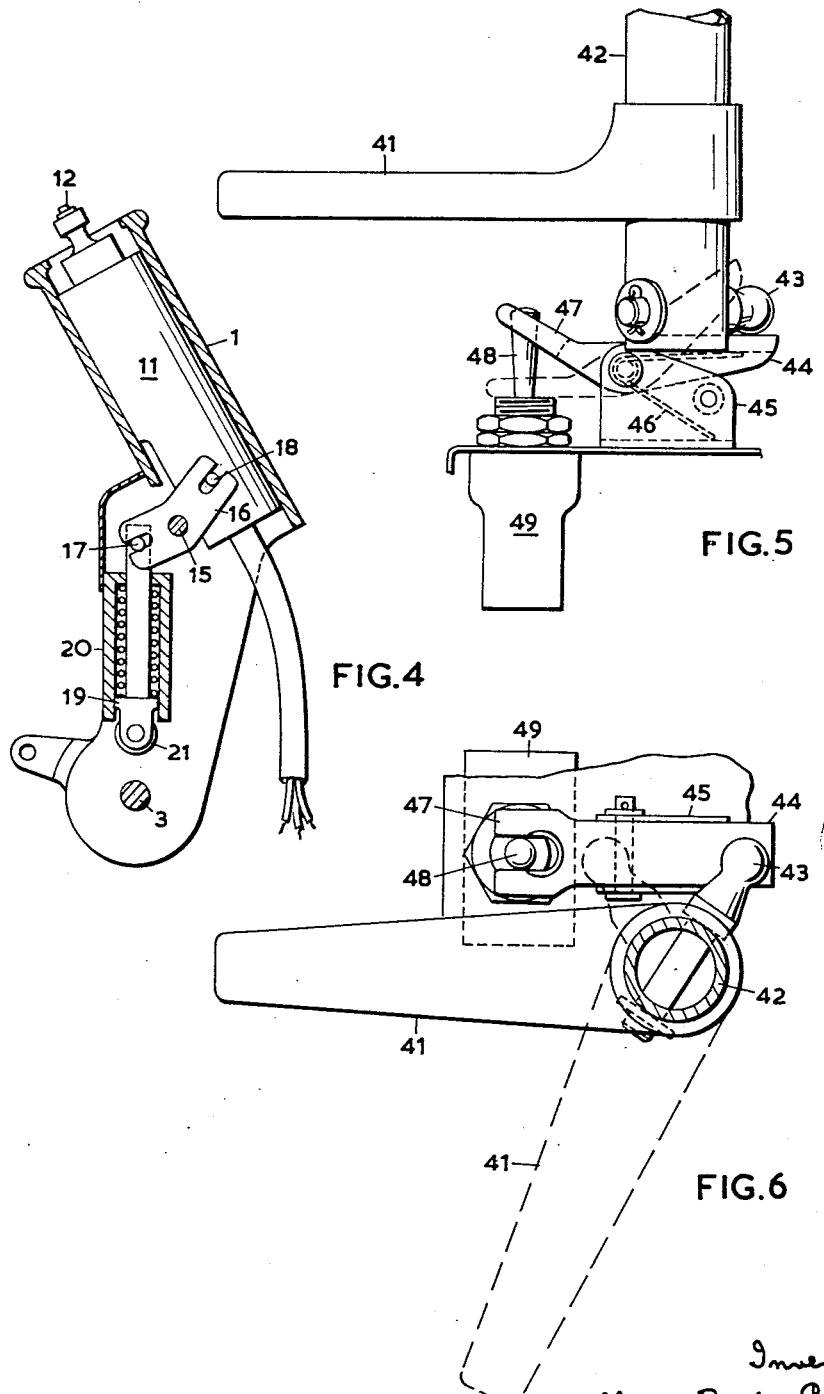

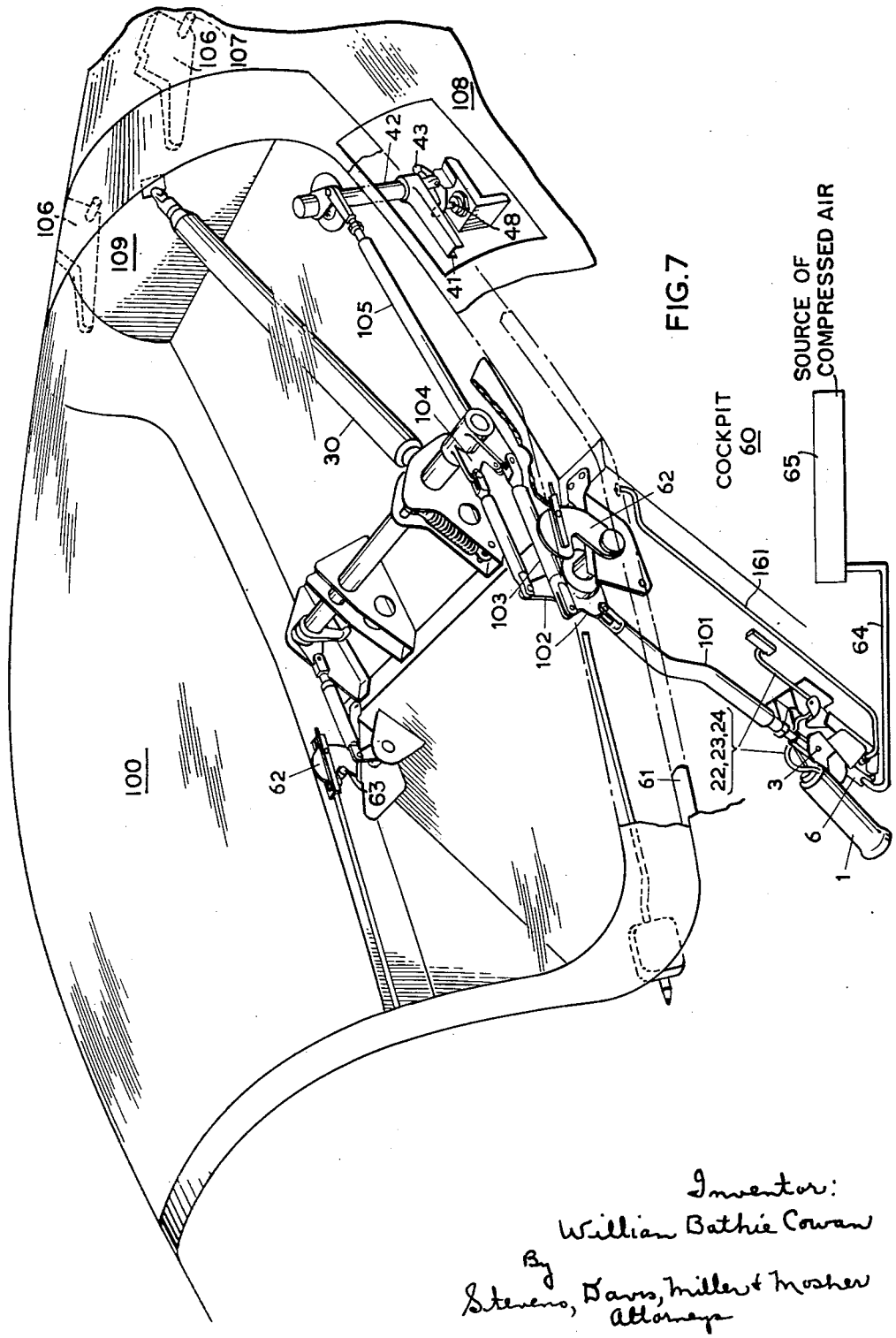

United States Patent Office 3,006,583
Patented Oct. 31, 1961

3,006,583
LOCKING AND ACTUATING MECHANISMS
FOR AIRCRAFT CANOPIES
William Bathie Cowan, Lytham St. Annes, England, assignor to The English Electric Company Limited, London, England, a British company
Filed Nov. 19, 1957, Ser. No. 697,437
Claims priority, application Great Britain Jan. 25, 1957
3 Claims. (Cl. 244—121)

The present invention relates to locking and actuating mechanism for aircraft cockpits, and has the object of opening and closing the cockpit canopy both from inside and on the ground from outside, automatically breaking and remaking the pneumatic seal thereof before opening and after closing the canopy, respectively.

According to the invention one locking lever is arranged inside the said cockpit and another is accessible from the outside of the aircraft, the said two levers being mechanically coupled to one another and to a valve controlling the inflation and deflation of an inflatable seal between said cockpit and canopy, each of the said levers being mechanically associated with a throw-over switch and in its canopy locking position, locking its associated switch in an inoperative position, and in its canopy releasing position clearing its associated switch for operation, the said two switches being electrically connected in parallel to one another to two solenoids controlling a hydraulic valve so as to admit hydraulic fluid to a hydraulic jack operating the said canopy alternatively in the sense of opening and closing the latter.

In operation for the opening of the cockpit canopy the pneumatic seal of the canopy is deflated; then the usual latches or bolt locking the canopy to the fuselage are withdrawn firstly by the movement of either of the said locking levers by mechanical linkage to the said locking lever, and the respective switch is released for operation. By operating the said switch in the opening sense, the circuit of that solenoid is closed, which turns the hydraulic valve into a position admitting hydraulic pressure fluid to the said jack in the sense of opening the canopy.

Conversely by operating one of the said switches in the closing sense, the circuit of the other solenoid is closed which turns the said valve into the position in which it admits hydraulic pressure fluid to the said jack in the sense of closing the canopy. By returning the respective locking lever to the closing position, the said latches or bolts are engaged again, the said canopy seal is then inflated, and the said switches are locked in the inoperative positions.

In order that the invention may be clearly understood and readily carried into effect an embodiment thereof will now be described by way of example with reference to the accompanying drawings in which:

FIG. 1 is a diagrammatic general arrangement in the position with the canopy locked, the canopy operating hydraulic jack retracted and the solenoid controlled valve in the neutral position.

FIG. 2 corresponds to FIG. 1, but shows the position with the canopy unlocked, the hydraulic jack extended, and the solenoid valve selected "up."

FIG. 3 also corresponds to FIG. 1, but shows the position with the canopy unlocked, the hydraulic jack retracted, and the solenoid valve selected "down."

FIG. 4 is a lateral sectional elevation of the internally operated canopy locking handle assembly.

FIGS. 5 and 6 are an elevation and a plan view, respectively, of the externally operated canopy locking assembly.

FIG. 7 shows a perspective general arrangement.

Figure 1:
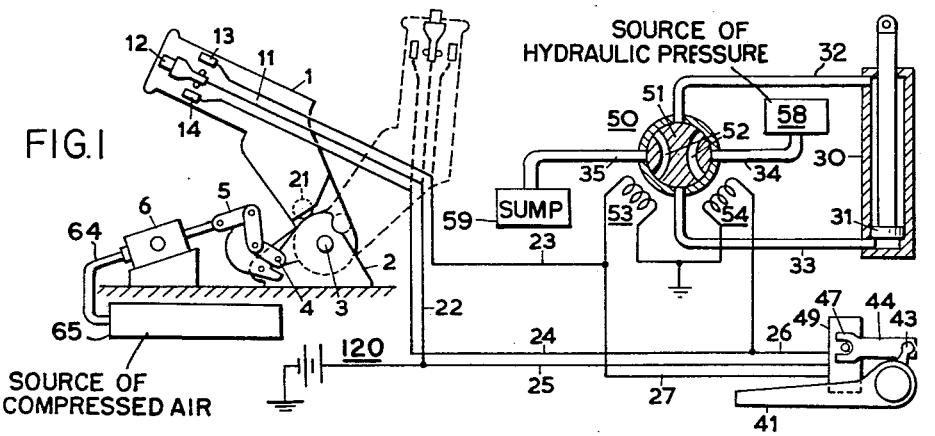
Figure 2:
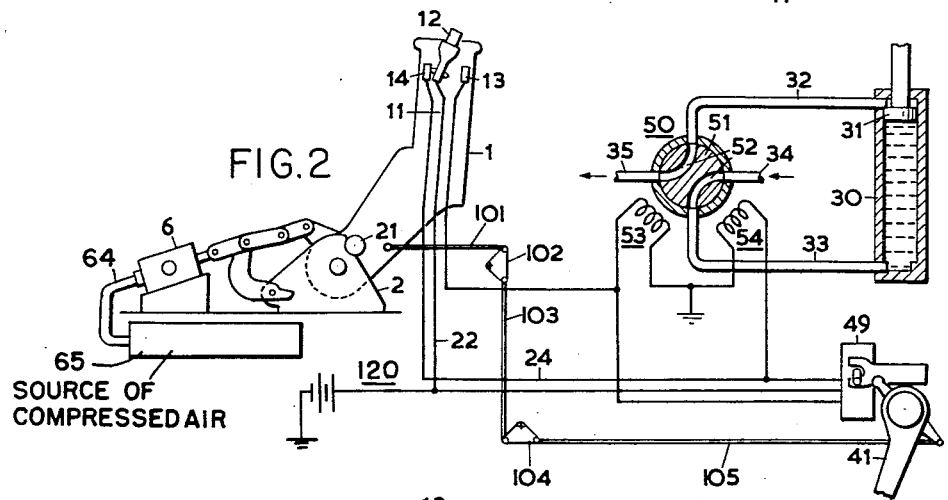
Figure 3:
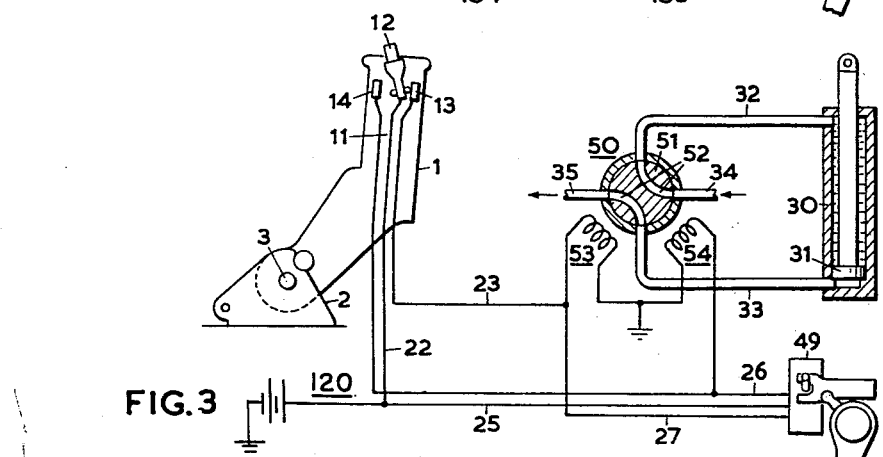

Referring firstly to FIGS. 1 to 3, the internally operated locking handle 1 is pivotally mounted on an axle 3 in the cam-bracket 2 which is fixed in the cockpit 60 (FIG. 7). An extension of the handle 1 is articulated by a pin 4 to a toggle lever mechanism 5 which is in turn articulated to the stem of an air valve 6 which is also mounted in the cockpit and through pipe 161 controls the inflating and deflating of the canopy seal 61 (FIG. 7) from a source of compressed air 65 through connection 64. The internal canopy locking handle 1 includes a tumbler switch assembly 11 (FIG. 4) which is arranged slidably in the handle 1 and has one position in which it is completely retracted in the handle 1 (FIG. 1 full lines) and another position in which the button of its tumbler contact piece 12 projects from the end of said handle 1 ready for use, so that it can be tipped into contact with either one of the fixed contact pieces 14 or 13 (FIG. 1, dotted lines and FIGS. 2 and 3, respectively) mounted insulated in the said grip.

The tumbler contact piece 12 is connected by a conductor 22 to an electric supply source 120, and the fixed contact pieces 13, 14 are connected by conductors 23, 24 respectively, to the "down" solenoid 53 and "up" solenoid 54, respectively, the other terminals of which are grounded.

These solenoids 53, 54 control the cock 51 of a selector valve 50. This valve is connected by a pipe 34 to a hydraulic pressure supply source 58, by a pipe 35 to a sump 59, and by pipes 32, 33 to the two opposite ends of a hydraulic jack 30, the piston 31 of which is articulated to the canopy 100 (FIG. 7) hinged by means of brackets 106 and pins 107 to a bulkhead 109 of the fuselage 108 of the aircraft. The cock 51 contains two separate curved ducts 52. The valve 50 is illustrated diagrammatically and could be of any other suitable type.

The externally operated canopy locking assembly comprises a handle 41 pivotally mounted on the aircraft fuselage and having a ball-headed pin 43 co-operating with a spring biased rocker lever 44 embracing with its forked end 47 the lever of a tumbler switch 49, the central tumbler contact piece of which is connected by a conductor 25 to the aforesaid source of electric supply, and the two fixed contacts of which are connected by the conductors 26, 27 to the "up" solenoid 54 and "down" solenoid 53 respectively, the whole tumbler switch corresponding to the tumbler switch 12—14 described with reference to the internally operated canopy locking handle. The levers 1 and 41 are mechanically connected to one another by a linkage 101—105 diagrammatically indicated in FIGS. 2 and 7.

Referring now to FIG. 4, a spindle 19 is fitted radially with respect to the axle 3 into the handle 1. The inner end of said spindle carries a roller 21 running on the said cam bracket 2 (FIG. 1) against which it is biased by a coiled compression spring 20 surrounding the said spindle 19. The outer end of said spindle has a transverse pin 17 engaging one slotted end of a two-armed lever 16 pivotally mounted on the said lever 1, the other slotted end of which co-operates with a pin 18 mounted in a sliding sleeve of the tumbler switch assembly 11.

Referring now to FIGS. 5 and 6, the externally operated locking lever 41 which is mechanically linked to the lever 1, is mounted on a tubular shaft 42 to which the said ball-headed pin 43 is fitted. The rocker lever 44 is pivotally mounted on a bracket 45 and is held by the pin 43 in the position shown in full lines in which its forked end 47 screens the tumbler lever 48 of the said switch 49 so that the same cannot be operated. However, when the lever 41 is turned into the position shown in dotted lines, the pin 43 clears the rocker lever 44 and the latter is biased by a spring 46 into a position in which it clears the tumbler lever 48, so that the tumbler switch 49 may be operated.

The operation of the aircraft canopy locking and actuating mechanism according to the present invention is as follows: In order to open the canopy from inside the cockpit, the internally operated locking handle 1 is pulled upward from the position shown in FIG. 1, in full lines to the position shown in dotted lines. The first few degrees of this movement of the handle 1 releases the air pressure from the canopy pressure seal by actuating the air valve 6; the remainder of the movement releases the latches 62 (FIG. 7). The roller 21 which rides on the cam bracket 2 then drops into the recessed part of it under the action of the spring 20 (FIG. 4), and the two-armed lever 16 consequently pushes the whole tumbler switch assembly 11 radially outward so that the button of the tumbler switch lever 12 protrudes from the handle 1 (FIG. 1, dotted lines and FIG. 4.)

By moving the tumbler switch lever 12 into the position shown in FIG. 2 the circuit from the current supply line 22 through switch contact 14, conductor 24 and the "up" solenoid 54 of the valve 50 is closed, and the cock 51 of the latter is turned from the neutral position of FIG. 1 into the position of FIG. 2 in which its inner conduits 52 connect the hydraulic supply pipe 34 through the pipe 33 to the inner end of the cylinder of the hydraulic jack 30 whereby the piston 31 is moved into the extended position of FIG. 2 and the canopy linked to said jack is opened. The outer end of the cylinder of the hydraulic jack 30 is at the same time connected through the pipe 32 to the pipe 35 leading to the reservoir.

Both the tumbler switch lever 12 and the cock 51 are biased by springs (not shown) to a neutral position. Accordingly, the selector valve 50 will automatically return to the neutral position shown in FIG. 1 as soon as the tumbler switch lever 12 is released. The canopy can thus be raised to and stopped at any angle between closed and fully open.

In order to close the canopy from inside the cockpit, the tumbler switch lever 12 is moved to the position of FIG. 3 whereby the circuit from the supply conductor 22 through the switch contact 13, conductor 23 and "down" solenoid 53 to ground is closed. Consequently the cock 51 is turned into the position shown in FIG. 3 in which the hydraulic supply pipe 34 is connected by one of the ducts 52 to the outer end of the cylinder of the hydraulic jack 30, the piston 31 of which is accordingly retracted, and the canopy is closed. The inner end of the cylinder of the jack 30 is at the same time connected by the pipe 33 and the other duct 52 of the cock 51 to the pipe 35 leading to the reservoir.

The handle 1 is then turned back into the position of FIG. 1 whereby the tumbler switch is retracted at once, the latches 62 locked to pins 63 of the cockpit 60 and then the canopy seal is inflated through the action of the air valve 6.

When opening the canopy from the outside, the external locking handle 41 is turned from the position FIG. 1 and FIGS. 5, 6 (full lines) to the position of FIGS. 2, 3 and 5, 6 (dotted lines). Consequently the two-armed lever 44, which had been held in the position shown in FIG. 5 in full lines by the ball head of the pin 43, is cleared, and is allowed to rock into the position shown in FIG. 5 in dotted lines, in which its forked end 47 clears the tumbler lever 48 of the switch 49. By operating this tumbler in one sense the circuit from the electric supply line 25 through the conductor 26 and "up" solenoid 54 to ground is closed, with the effect described hereinabove in detail with respect to FIG. 2 of opening the canopy. The handle 41 is coupled by linkage to the handle 1 so that the deflating of the canopy seal is effected as described.

Conversely when the tumbler 49 is operated in the opposite sense, the circuit from the supply line 25 through the conductor 27 and "down" solenoid 53 to ground is closed, the conditions described hereinabove with reference to FIG. 3 are established, and the canopy is closed. The canopy seal is inflated by returning the handle 41 to the position shown in full lines in FIG. 6 whereby the handle 1 is also returned to the position shown in full lines in FIG. 1.

What I claim as my invention and desire to secure by Letters Patent, is:

1. A mechanism for deflating a pneumatic sealing, drawing locks, and raising the canopy of an aircraft cockpit in the proper sequence, and conversely lowering the said canopy, locking the said locks and inflating the said sealing in the proper sequence, to be operated both from inside and on the ground from outside the aircraft, comprising in combination: a cockpit, a canopy hinged to the said cockpit, latches locking the said canopy in the closed position to the said cockpit, a first locking lever pivotally mounted inside the said cockpit, a second locking lever mounted outside on the said cockpit, an inflatable seal interposed between the said cockpit and the said canopy, a control valve controlling the inflation and deflation of the said seal, mechanical linkage operatively connecting the said locking levers to one another, to the said control valve and to the said latches, a source of hydraulic pressure having a sump, a hydraulic jack operatively connected to the said cockpit and to the said canopy for opening and closing the latter, a selector valve controlling the hydraulic connection of said jack alternatively to the said pressure source and sump thereof, an electric current source, two solenoids operatively connected to the said selector valve and adapted to adjust the same to the positions for opening and for closing the said canopy respectively, and two throw-over switches electrically shunted in parallel to one another and each mechanically associated with one of the said locking levers and electrically connected to the said electric current source and to both of the said solenoids, and having a rest position de-energising both said solenoids and two working positions in one of said working positions energizing one of the said solenoids, and in the other working position energizing the other solenoid.

2. A locking and actuating mechanism as claimed in claim 1, wherein the said throw-over switch associated with the said first locking lever is slidably mounted inside the said lever being locked inaccessibly therein in the canopy locking position of the said lever and being spring biased into an operative position projecting from the said lever in the canopy unlocking position of the latter.

3. A locking and actuating mechanism as claimed in claim 1, wherein the said second locking lever has an arm, and comprising a double armed rocker lever pivotally mounted on the said cockpit adjacent the said second locking lever co-operating with the said arm at one end and being forked at the other end adapted to embrace the said throw-over switch associated with the said second locking lever and to lock the said switch in the rest position, the said rocker lever being retained by the said arm in the position locking said switch in the canopy locking position of the said second locking lever, and in the canopy opening position of the said lever being spring biased so as to clear the said throw-over switch for operation.

References Cited in the file of this patent

UNITED STATES PATENTS

| | | |
|---|---|---|
| 2,570,622 | Willis | Oct. 9, 1951 |
| 2,607,551 | Clark et al. | Aug. 19, 1952 |
| 2,638,292 | Horne et al. | May 12, 1953 |
| 2,673,050 | Patch et al. | Mar. 23, 1954 |
| 2,832,553 | Wallenhorst | Apr. 29, 1958 |